United States Patent
Gier et al.

(10) Patent No.: US 8,042,393 B2
(45) Date of Patent: Oct. 25, 2011

(54) ARRANGEMENT FOR MEASURING A RATE OF ROTATION USING A VIBRATION SENSOR

(75) Inventors: Lothar Gier, Bad Nauheim (DE); Volker Kempe, Lieboch (AT); Drago Strle, Ljubljana (SI)

(73) Assignees: Continental Automotive GmbH, Hannover (DE); SensorDynamics AG, Graz-Lebring (AT)

( * ) Notice: Subject to any disclaimer, the term of this patent is extended or adjusted under 35 U.S.C. 154(b) by 380 days.

(21) Appl. No.: 12/443,664

(22) PCT Filed: Sep. 13, 2007

(86) PCT No.: PCT/EP2007/059607
§ 371 (c)(1),
(2), (4) Date: Apr. 23, 2009

(87) PCT Pub. No.: WO2008/040616
PCT Pub. Date: Apr. 10, 2008

(65) Prior Publication Data
US 2010/0011857 A1    Jan. 21, 2010

(30) Foreign Application Priority Data
Sep. 29, 2006 (DE) .......................... 10 2006 046 772

(51) Int. Cl.
*G01C 19/56* (2006.01)
(52) U.S. Cl. ............... 73/504.02; 73/504.04; 73/504.08; 73/504.12; 73/504.18
(58) Field of Classification Search .................. None
See application file for complete search history.

(56) References Cited

U.S. PATENT DOCUMENTS

| 4,744,248 | A | * | 5/1988 | Stewart | 73/504.04 |
| 4,744,249 | A | * | 5/1988 | Stewart | 73/504.04 |
| 5,604,311 | A | * | 2/1997 | Kumar et al. | 73/504.14 |
| 5,955,668 | A | | 9/1999 | Hsu | |
| 6,067,858 | A | | 5/2000 | Clark et al. | |
| 6,327,907 | B1 | | 12/2001 | Park | |
| 6,561,029 | B2 | | 5/2003 | Folkmer et al. | |
| 6,626,039 | B1 | | 9/2003 | Adams | |
| 6,686,807 | B1 | | 2/2004 | Giousouf et al. | |
| 7,040,164 | B2 | | 5/2006 | Painter et al. | |
| 2005/0081633 | A1 | * | 4/2005 | Nasiri et al. | 73/514.29 |
| 2006/0156815 | A1 | | 7/2006 | Chen | |

FOREIGN PATENT DOCUMENTS

| DE | 10006933 A1 | 12/2000 |
| DE | 60012217 T2 | 8/2005 |
| DE | 69735759 T2 | 11/2006 |
| WO | WO 9815799 A1 | 4/1998 |
| WO | WO 2005062754 A2 | 7/2005 |

* cited by examiner

*Primary Examiner* — Andre Allen
(74) *Attorney, Agent, or Firm* — Cozen O'Connor

(57) ABSTRACT

An arrangement for measuring a rate of rotation using a vibration sensor, being excited and measured by means of capacitive drive elements, and the rotation of said sensor in an axis, excited by a rotation in another axis by means of the Coriolis force, being measured by means of capacitive measuring elements. Excitation voltages can be supplied to the fixed electrodes of the drive elements, the frequency of said voltages corresponding to the resonance frequency or the subharmonic of the resonance frequency of the vibration sensor. An alternating voltage having a first measuring frequency which is higher than the excitation frequency can be supplied to capacitive elements for measuring the excited vibration. Alternating voltages having a second measuring frequency higher than the excitation frequency are supplied to the fixed electrodes of the measuring elements can be supplied to drive elements causing a vibration excitation in a direction on the basis of the excitation voltage, being in antiphase with the excitation voltage.

11 Claims, 4 Drawing Sheets

ARRANGEMENT FOR MEASURING A RATE OF ROTATION USING A VIBRATION SENSOR

PRIORITY CLAIM

This is a U.S. national stage of application No. PCT/EP2007/059607, filed on 13 Sept. 2007, which claims priority to the German Application No.: 10 2006 046 772.8, filed: 29 Sept. 2006; the contents of both being incorporated herein by reference.

BACKGROUND OF THE INVENTION

1. Field of the Invention

The invention relates to an arrangement for measuring a rate of rotation using a vibration sensor. Vibration that is perpendicular to a first axis is excited and measured with the aid of capacitive drive elements, and the rotation about a second axis, which is excited by rotation in a third axis under the action of the Coriolis force, is measured with the aid of capacitive measuring elements, the capacitive elements each being formed by fixed electrodes and by electrodes which can be moved with the vibration sensor, the movable electrodes being jointly connected to a fixed connection.

2. Description of Prior Art

Rate of rotation sensors are used, for example, in safety systems for motor vehicles. A vibration sensor in the form of a gyroscope has been disclosed, for example, in U.S. Pat. No. 5,955,668. In this case, the rotational vibration is excited with the aid of electrostatic drives. The output signal and a signal for regulating the drives are likewise obtained electrostatically, by means of capacitance measurements with the aid of supplied AC voltages. In this case, the amplitude of the AC voltage supplied to the drive is considerably greater than that of the signals obtained from the change in capacitance, with the result that, in particular, the output signal to be processed further in order to determine the rate of rotation is subject to considerable interference. This impairs the measurement accuracy.

SUMMARY OF THE INVENTION

An object of the present invention is to specify an arrangement for measuring a rate of rotation, the accuracy of which satisfies high demands and which has a large dynamic range, such that very low rates of rotation are also measured with sufficient accuracy, while no overdriving occurs at high rates of rotation.

According to one embodiment of the invention, fixed electrodes of the capacitive drive elements are supplied with excitation voltages, the frequency of which correspond to the resonant frequency or to a subharmonic of the resonant frequency of the vibration sensor. The capacitive elements, which are used to measure the excited vibration, can be supplied with an AC voltage at a first measuring frequency which is higher than the frequency of the excitation voltages. The fixed electrodes of the capacitive measuring elements are supplied with AC voltages at a second measuring frequency which differs from the first measuring frequency and is higher than the frequency of the excitation voltages.

According to one embodiment of the invention, further capacitive measuring elements are provided for the purpose of measuring the excited vibration or the capacitive drive elements are used to measure the excited vibration.

According to one embodiment of the invention, one advantageous and interference-proof possible way of obtaining the output signal, which describes the rate of rotation is to use means which, in order to form a signal which represents the rate of rotation, synchronously demodulates a signal tapped off from the fixed connection using the AC voltage at the second measuring frequency and then using the excitation voltage.

Another embodiment of the invention provides means to demodulate the signal tapped off from the fixed connection using the first measuring frequency and use the demodulated signal to regulate the excitation voltages.

According to one embodiment of the invention it is possible to operate the arrangement with considerable AC voltages for driving and to use the signals, which are taken from the second capacitive elements, for the purpose of regulating the drive and the signals that are taken from the third capacitive elements for the purpose of forming the rate of rotation signal are also extremely small. However, due to the small interference components caused by the drive currents, these signals can be evaluated in an effective manner using, for example, low-noise amplifiers. In this case, in particular, a charge amplifier, whose output is connected to a bandpass filter, is connected to the fixed connection. As a result, even small remnants of the drive currents are attenuated further.

To keep the drive currents occurring at the fixed connection low from the outset, another embodiment involves providing at least four groups of capacitive drive elements, antiphase AC voltage components and the same bias voltages respectively being applied to two of said groups.

This may be carried out, for example, as follows:
$U1=U10+U11 \sin \omega t$
$U2=U10-U11 \sin \omega t$
$U3=-U1$
$U4=-U2$ As a result, the charge currents at the fixed connection are compensated for, whereas the drive torques generated are intensified since the drive torques are proportional to $U^2$. These measures can also be used successfully without the measures in the preceding claims and considerably reduce the interference caused by the excitation voltages.

A person skilled in the art can select, in detail, the frequencies or the ratios of the frequencies to one another taking into account the respectively present circumstances. However, it has proved to be favorable if the first and second measuring frequencies are within a range of 10 times to 500 times the frequency of the excitation voltage.

The invention is suitable for different types of vibration sensors but the vibration sensor is preferably a vibrational gyroscope. However, linearly oscillating vibration sensors, for example, may also be configured according to the invention.

BRIEF DESCRIPTION OF THE DRAWINGS

The invention allows numerous embodiments. One of said embodiments is schematically illustrated in the drawing using a plurality of figures and is described below. In the drawing.

DETAILED DESCRIPTION OF THE PRESENTLY PREFERRED EMBODIMENTS

Figure 1:
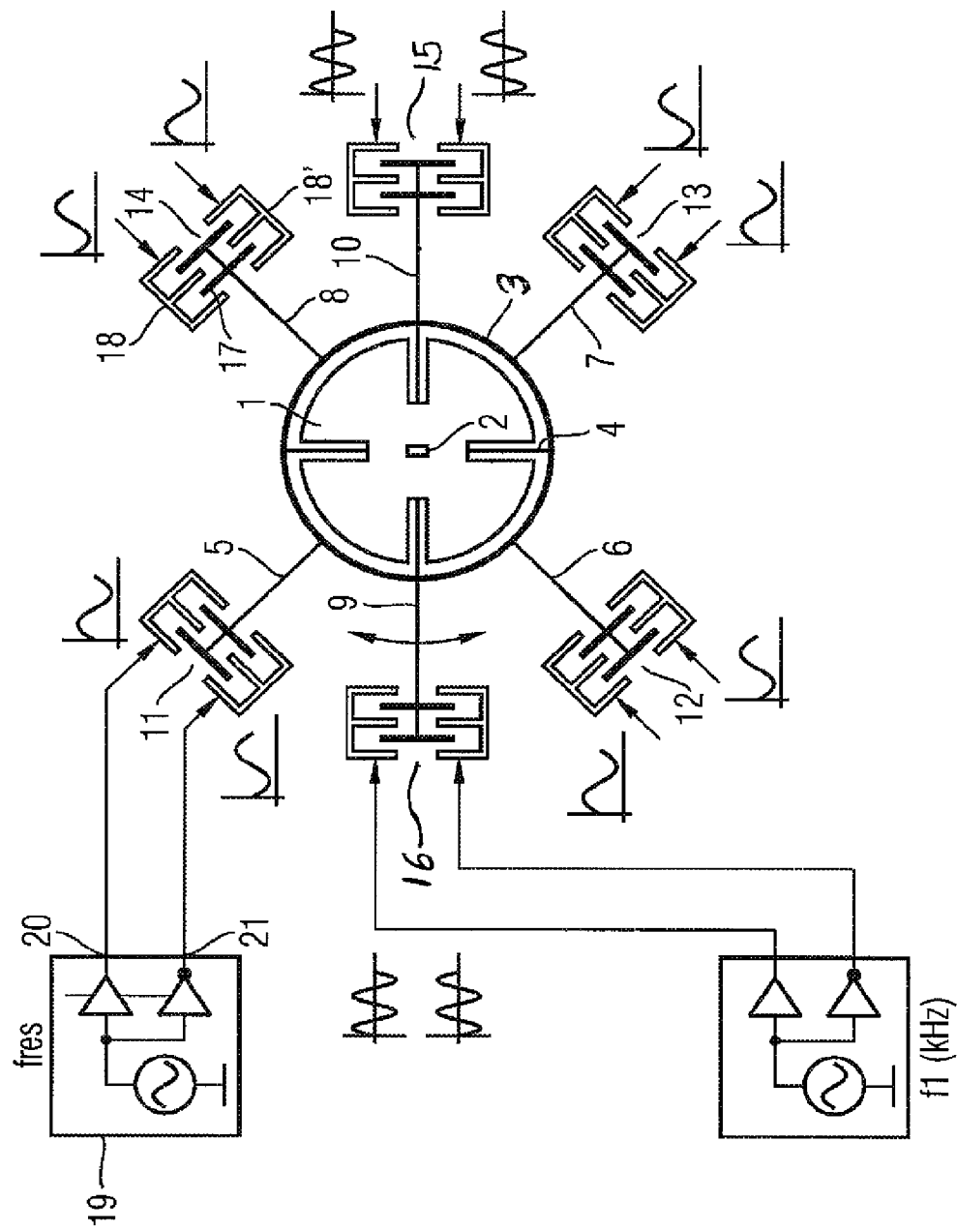
FIG. 1 is a schematic view of a vibrational gyroscope having the elements and supplied AC voltages needed to drive and regulate the drive.

The vibrational gyroscope illustrated in FIG. 1 comprises a disk 1 which is mounted such that it can be tilted at 2 but cannot be rotated. A ring 3 is connected to the disk 1 via resilient tongues 4 in such a manner that it can be made to vibrate rotationally with respect to the disk 1.

A plurality of arms 5 to 10 having capacitive elements 11 to 16 are situated on the circumference of the ring 3. In the schematic illustration according to FIG. 1, the arms 5 to 10 are illustrated in lengthened form in comparison with an exemplary embodiment. The capacitive elements 11 to 16 each comprise electrodes 17, which are arranged on the arm and can therefore be moved with the ring 3, and fixed electrodes 18, 18'.

The fixed electrodes 18, 18' are applied, such that they are insulated, to a substrate (not illustrated) that integrally includes elements 1 to 17. Methods for patterning the substrate are known in the art and do not need to be discussed in any more detail in connection with the invention.

The electrodes 18, 18' of the capacitive elements 11 to 14 are supplied with AC voltages at the same frequency but with a different phase angle for the purpose of exciting the rotational vibration referred to as the excitation voltage below. In this case, as illustrated in the small voltage diagrams, a DC voltage is respectively superposed on the excitation voltages, with the result that the electrodes 18 and the electrodes 18' have the same DC voltage components and antiphase AC voltage components. This is effected in order to generate a periodic total torque because the torque generated at the electrode 18, for example, is proportional to the square of the voltage applied there and is thus always positive. Only the sum of the two torques, which are generated by the electrodes 18 and 18', contains the desired AC component.

In order to generate a sufficiently high drive force, the electrodes 17 are interleaved with the electrodes 18, 18' in a comb-like manner. While only two individual electrodes are respectively illustrated for the sake of clarity, the number of electrodes is typically considerably higher.

A frequency-controlled oscillator (VCO) 19 having two antiphase outputs 20, 21 is used to generate antiphase excitation voltages which, provided with corresponding bias voltages, are supplied to the capacitive elements 11 to 13. The connection 2 which is explained in more detail below in connection with the operation of obtaining the rate of rotation signal is used to feed back (not illustrated) the currents generated by the excitation voltages. The capacitive measuring elements 15, 16 are used to regulate the rotational vibration, AC voltages which are generated in an oscillator 22 and are at a first measuring frequency f1 being applied to said measuring elements. As likewise explained below, the operation of supplying these AC voltages is used to measure the capacitance of the capacitive elements 15, 16 and thus to obtain a signal which represents the rotational vibration.

Figure 2:
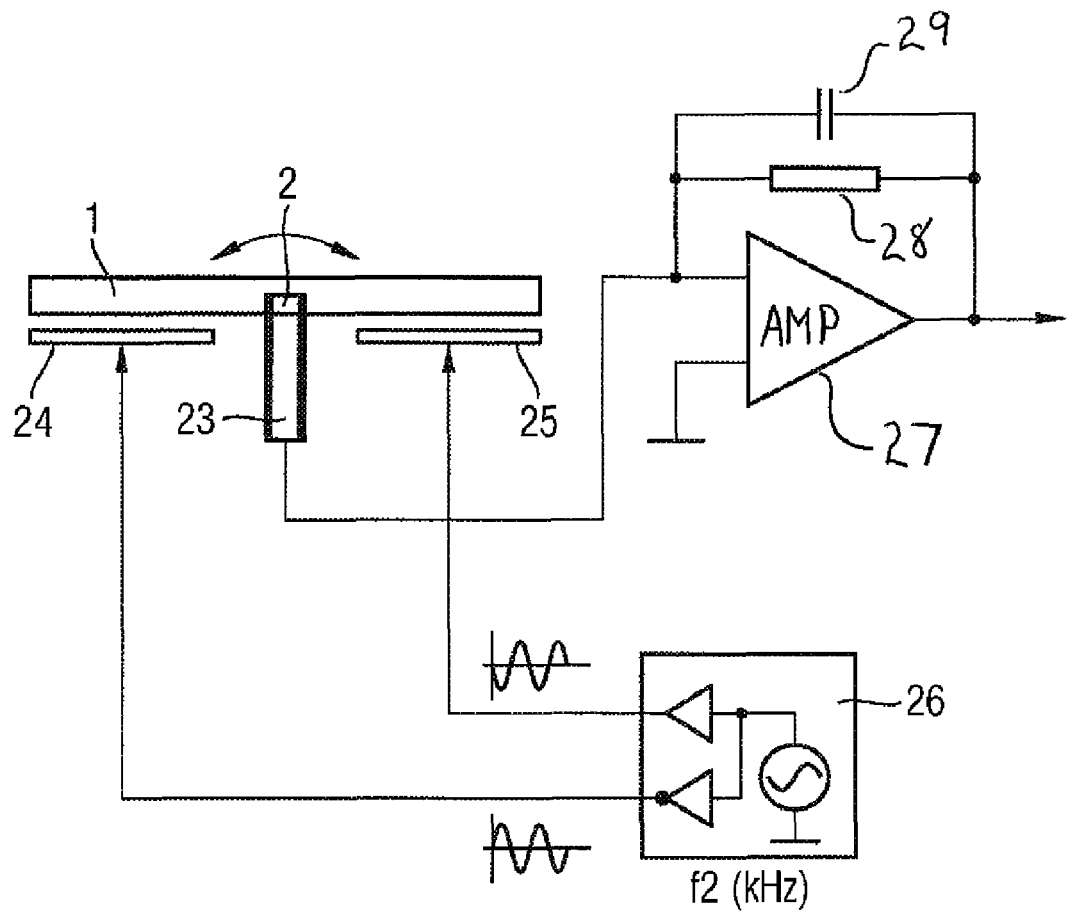
FIG. 2 is a schematic of the vibrational gyroscope having the components needed to remove signals.

FIG. 2 shows a side view of the disk 1 and its mounting 2 with the common connection 23. The movement illustrated by a double-headed arrow is caused by the Coriolis force and represents the rate of rotation to be measured. The tilting movement is determined by measuring the capacitance and antiphase AC voltages generated by an oscillator 26 at a second measuring frequency f2 applied to two electrodes 24, 25. The fixed connection 23 is connected to the input of an amplifier 27 which has feedback via a resistor 28 and a capacitor 29 and represents a form of charge amplifier.

Figure 3:
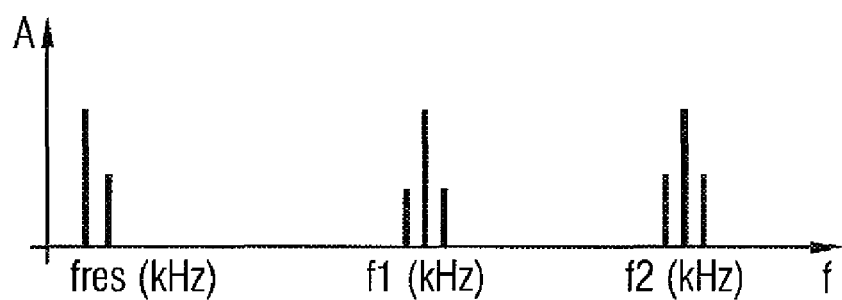
FIG. 3 is a spectrum of the signals applied to the fixed connection of the vibrational gyroscope.

The signal at the connection 23 has the spectrum indicated in FIG. 3. Components at the excitation frequency (the resonant frequency, fres in the example illustrated) are at twice the excitation frequency (2 fres) produced as a result of the capacitance oscillation and excitation voltage being mixed, at the first measuring frequency f1 and at the second measuring frequency f2. The measuring frequencies have sidebands comprising the measuring information. The components at the frequencies fres and 2×fres may give rise to considerable overdriving and interference that is largely suppressed by the sign-alternating driving in the four drive groups.

Figure 4:
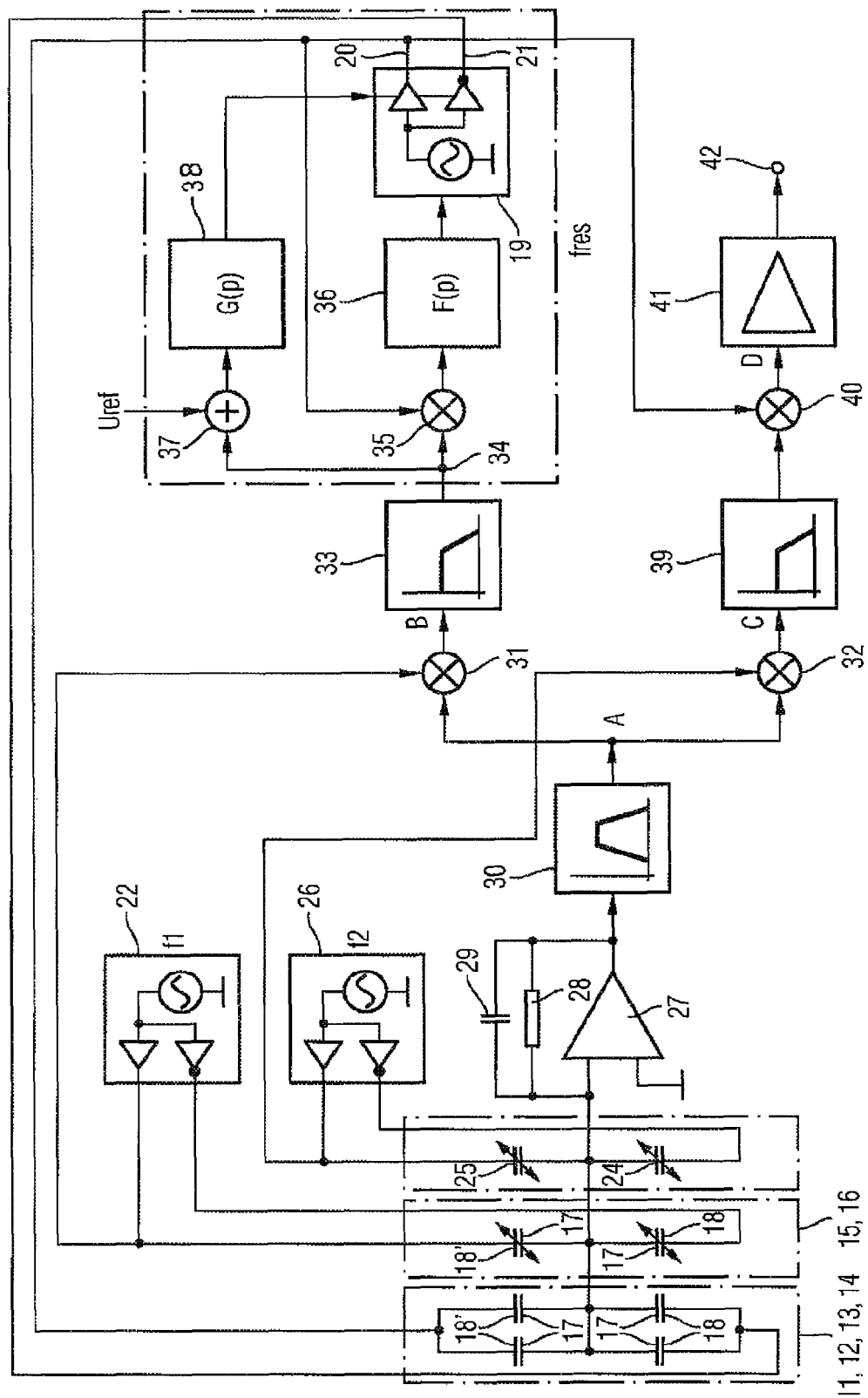
FIG. 4 is a block diagram of an arrangement according to the invention.
Figure 5A:
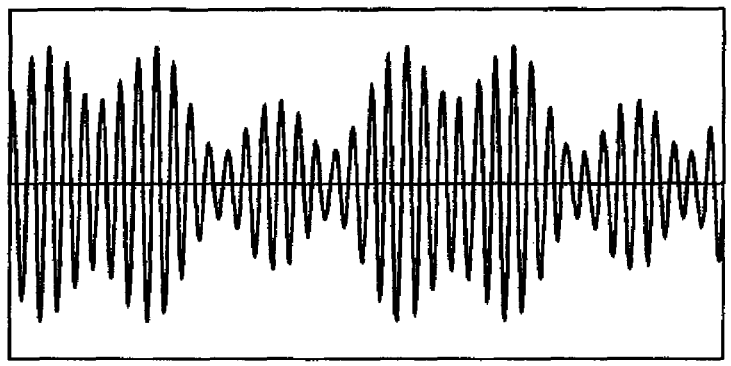
FIGS. 5a-5d are voltage timing diagrams for different signals which occur in the arrangement according to FIG. 4.
Figure 5B:
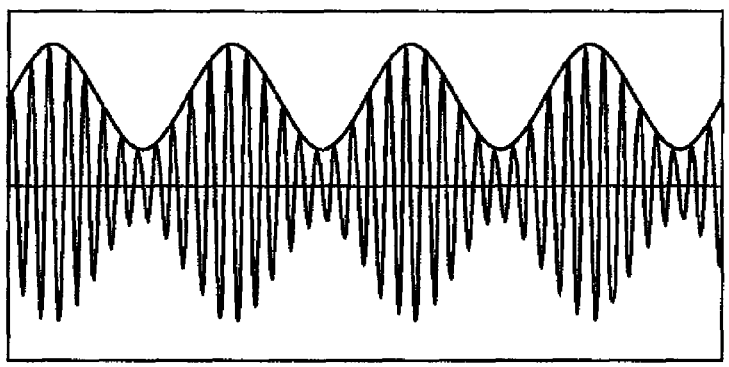
Figure 5C:
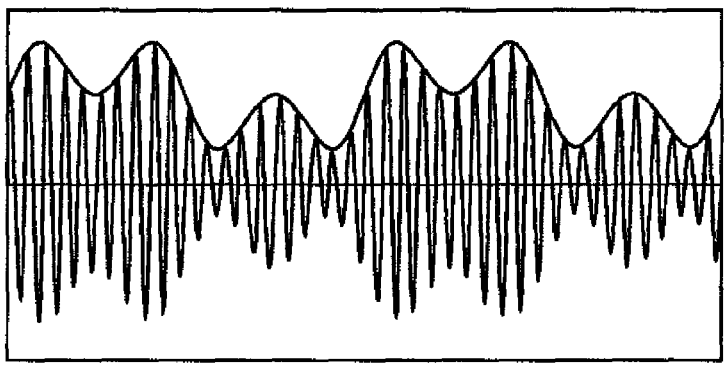
Figure 5D:
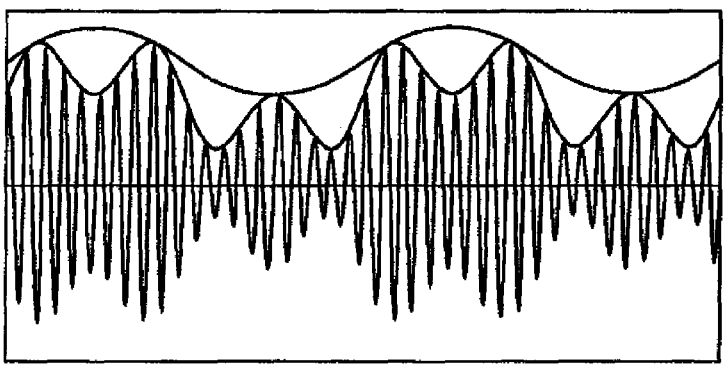

In the schematic diagram, according to FIG. 4, the capacitive elements 11 to 14 and 15, 16 are illustrated independently of their mechanical design, in comparison with FIG. 1, with the result that the electrodes 18 and 18', together with the electrodes 17, respectively constitute a pair of capacitors, only two pairs of capacitors are illustrated instead of four pairs of capacitors 11 to 14 and only one pair of capacitors are illustrated instead of two pairs of capacitors 15, 16, for the sake of clarity. The charge amplification 27 at the output 23 and the subsequent bandpass filtering 30 have already been described in connection with FIGS. 2 and 3.

Two multipliers 31, 32 in which synchronous demodulation using the measuring frequencies f1 and f2 is carried out are connected to the output A of the filter 30. The demodulated signals are denoted using B and C. Following low-pass filtering at 33, a signal which represents the rotational oscillation of the vibrational gyroscope is present at 34. This signal is supplied to a further multiplier 35 which forms a control loop together with a regulator 36 having a characteristic F(p) and the oscillator 19. As a result, both the frequency and the phase angle of the output voltage of the oscillator 19 are controlled so that a stable oscillation is produced. To control the amplitude of the oscillation, the signal at 34 is compared with a reference voltage Uref using an adder 37 and is supplied to a control input of the oscillator 19 via a further regulator 38 with the characteristic G(p). The excitation voltage provided with a DC voltage component being present at the outputs 20, 21 of said oscillator.

In order to generate the rate of rotation signal, the output signal C from the multiplier 32 is passed to a low-pass filter 39. From there, the signal passes to a further multiplier 40 which is also supplied with a signal at the frequency fres, as a result of which said multiplier operates as a synchronous demodulator. The demodulated signal D represents the rate of rotation signal which is passed to an output 42 via an amplifier 41.

FIG. 5 shows different timing diagrams, namely a diagram A which illustrates the output signal A from the filter 30, a diagram B which illustrates the output signal B from the synchronous demodulator 31, a diagram C containing the output signal C from the synchronous demodulator 32, and a diagram D containing the output signal D from the synchronous demodulator 40, the carrier also being illustrated in addition to the envelope, namely the result of the demodulation, in order to illustrate the demodulation in the diagrams B, C and D.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An arrangement for measuring a rate of rotation comprising
    a vibration sensor, the vibration sensor comprising:
        a mount;
        a disk pivotably coupled to the mount; and
        a ring coupled to the disk, the ring configured to vibrate rotationally, perpendicular to a first axis with respect to the disk;
    a plurality of capacitive drive elements configured to rotationally vibrate the ring and measure the vibration of the ring perpendicular to the first axis;
    a plurality of capacitive measuring elements configured to measure a rotation of the disk in a second axis, which is excited by rotation in a third axis under the action of a Coriolis force,
    the capacitive drive elements and the capacitive measuring elements each respectively comprising:
        fixed electrodes; and
        moveable electrodes configured to be moved with the vibration sensor, the movable electrodes coupled to the mount,
    wherein the fixed electrodes of the capacitive drive elements are supplied with excitation voltages, a frequency of the excitation voltage corresponds to at least one of a resonant frequency or a subharmonic of the resonant frequency of the vibration sensor; and
    a plurality of capacitive vibration measuring elements configured to measure the excited vibration of the disk, the plural capacitive vibration measuring elements supplied with an AC voltage at a first measuring frequency which is higher than the frequency of the excitation voltages,
    wherein the fixed electrodes of the capacitive measuring elements are supplied with AC voltages at a second measuring frequency which differs from the first measuring frequency and is higher than the frequency of the excitation voltages.

2. The arrangement as claimed in claim 1, further comprising additional capacitive measuring elements configured to measure the excited vibration.

3. The arrangement as claimed in claim 1, wherein the capacitive drive elements are used to measure the excited vibration.

4. The arrangement as claimed in claim 1, further comprising a demodulator configured to form a signal that represents the rate of rotation and synchronously demodulate a signal tapped off from the mount using at least one of the AC voltage at the second measuring frequency and the excitation voltage.

5. The arrangement as claimed in claim 4, wherein the demodulator is configured to demodulate the signal tapped off from the mount using the first measuring frequency and use the demodulated signal to regulate the excitation voltages.

6. The arrangement as claimed in claim 1, further comprising a charge amplifier having an output coupled to a bandpass filter and an input coupled to the mount.

7. The arrangement as claimed in claim 1, wherein at least four groups of the capacitive drive elements are provided, wherein antiphase AC voltage components and the same bias voltages are respectively applied to two of said groups.

8. The arrangement as claimed in claim 1, wherein the first and the second measuring frequencies is about 10 times to 500 times the frequency of the excitation voltage.

9. The arrangement as claimed in claim 1, wherein the vibration sensor is a vibrational gyroscope.

10. An arrangement for measuring a rate of rotation, the arrangement comprising:
    a vibration sensor, the vibration sensor comprising:
        a mount having a fixed connection;
        a disk pivotably coupled to the mount; and
        a ring coupled to the disk, the ring configured to vibrate rotationally, perpendicular to a first axis with respect to the disk;
    at least four groups of capacitive drive elements configured to vibrate and measure vibration of the ring perpendicular to the first axis, wherein an antiphase AC voltage components and a same bias voltages respectively being applied to two of said groups of capacitive drive elements;
    a plurality of capacitive measuring elements configured to measure a rotation of the disk in a second axis, which is excited by rotation in a third axis in response to a Coriolis force,
    the plural capacitive drive elements and the capacitive measuring elements each comprising:
        fixed electrodes; and
        moveable electrodes configured to be moved with the vibration sensor, the movable electrodes being coupled to the fixed connection.

11. The arrangement as claimed in claim 1, further comprising at least one resilient member configured to couple the ring to the disk.

* * * * *